United States Patent [19]

Verhoeven

[11] Patent Number: 4,473,202

[45] Date of Patent: Sep. 25, 1984

[54] MAGNETIC-TAPE CASSETTE WITH IMPROVED ANTI-ERASE ARRANGEMENT

[75] Inventor: Robertus J. M. Verhoeven, Eindhoven, Netherlands

[73] Assignee: U.S. Philips Corporation, New York, N.Y.

[21] Appl. No.: 464,546

[22] Filed: Feb. 7, 1983

[30] Foreign Application Priority Data

Apr. 6, 1982 [NL] Netherlands ................. 8201452

[51] Int. Cl.³ .................. G03B 1/04; G11B 15/32
[52] U.S. Cl. .............................................. 244/198
[58] Field of Search ............... 242/192, 197–200, 242/55.19; 206/389; 360/93, 132

[56] References Cited

U.S. PATENT DOCUMENTS 3,622,102  11/1971  Fox ....................................... 242/199
4,097,006   6/1978  Saito .................................... 242/199
4,267,986   5/1981  Uemura et al. ...................... 242/199

Primary Examiner—Leonard D. Christian
Attorney, Agent, or Firm—David R. Treacy

[57] ABSTRACT

A magnetic tape cassette having two parallel rectangular major walls, and an anti-erase device adjacent a corner of the housing. A slotted recess in the edge between a first major wall and the rear housing wall receives a serrated slide whose outer surface is disposed within tangent planes to the first major wall and the rear wall. The slide is integral with an anti-erase member formed of a material having a color contrasting with that of the cassette housing, slidable parallel to the cassette rear wall. In a first position an opening in the member is aligned with an opening in the rear wall, and in a second position a portion of the member is exposed to view through the rear wall opening. In one of the two positions a sensing aperture in the major wall is closed by a control element on the anti-erase member.

9 Claims, 5 Drawing Figures

MAGNETIC-TAPE CASSETTE WITH IMPROVED ANTI-ERASE ARRANGEMENT

BACKGROUND OF THE INVENTION

The invention relates to a magnetic-tape cassette, which comprises:
- a housing having two mutually parallel substantially rectangular major walls, two side walls, a rear wall, and a front side formed with front apertures,
- two reel hubs arranged adjacent each between the major walls and rotatable about axes of rotation which extend perpendicularly to the major walls,
- a magnetic tape connected to the reel hubs, and extending, at least over a part of its length, along the front apertures to co-operate with parts of a magnetic-tape cassette apparatus in which the cassette is placed,
- a sensing aperture in one of the walls near a corner of the housing, for receiving a sensing element of the magnetic-tape cassette apparatus,
- an anti-erase member which is disposed at least partly inside the housing, which is slidable between a first and a second position in a substantially rectilinear manner, which can be latched in these positions, and which has a color which contrasts with the color of the housing,
- a control element which is integral with the anti-erase member, which element closes the sensing aperture when the member is in the first position, and leaves the aperture free in the second position,
- an actuating element which is situated outside the housing integral with the anti-erase member, and which enables the anti-erase member to be shifted manually,
- a window in one of the walls of the housing, through which window the position of the anti-erase member is visible, and
- an indicator element which is integral with the anti-erase member, which leaves the window free in the first position and which covers the window in the second position.

A magnetic-tape cassette of this type is known from Netherlands Patent Application No. 7604174, which has been laid open to public inspection, to which U.S. Pat. No. 4,041,537 corresponds. On each of the two side walls near the corners which adjoin the rear wall, this known magnetic-tape cassette comprises a brightly colored anti-erase member which is movable parallel to this side wall. Each anti-erase member is constructed and arranged in such a way that, viewed at the back or rear wall of the magnetic-tape cassette, the control element, which has the same bright color as all the other parts of the anti-erase member and when thus viewed forms a part which adjoins the major surface of the rear wall, is always distinctly visible, both in the first and in the second position of the anti-erase member. Moreover, the known magnetic-tape cassette has additional sensing apertures in the rear wall, at least one of the apertures being always covered by a part of the anti-erase member so that in both positions of the anti-erase member the same bright color is visible. The actuating element of the known cassette is integral with the control element and is also arranged in such a way that, viewed at the rear wall, it is conspicious in both positions. Therefore, as a result of the arrangement of these parts of the anti-erase member, two parts of the member are always distinctly visible owing to the contrasting color in any position of the member viewed at the rear wall of the cassette. Therefore, when the cassette is stored between a number of the cassettes in such a way that only the rear walls of the cassettes are visible, this is likely to lead to uncertainty when looking for a cassette which is suitable or not suitable for making a recording.

SUMMARY OF THE INVENTION

It is the object of the invention to provide a magnetic-tape cassette of this type, in which the position of the anti-erase member, which is entirely in a contrasting color, is clearly visible from the rear wall of the cassette.

To this end the invention is characterized in that the window is situated in the rear wall of the housing; the sensing aperture is situated in a first major wall of the housing; a slot is formed at the outside of the housing substantially at the edge between the first major wall and the rear wall, and the actuating element comprises a movable slide which has a non-smooth outer surface and is disposed in the slot. The non-smooth outer surface is disposed within tangent planes to the first major wall and the rear wall.

In this way a magnetic-tape cassette is obtained whose rear wall exposes the anti-erase member so that, for example when the cassette is disposed between other cassettes on a shelf, it can be determined unambiguously whether the relevant cassette is suitable for recording or not. Moreover, it remains possible to manufacture the anti-erase member integrally from a plastic material in a color which contrasts strongly with the color of the housing. As a result of the presence of the sensing aperture in the first major wall of the housing the control element of the anti-erase member is only visible from the major wall and not from the rear wall. Owing to the location of the actuating element and the slot substantially at the edge between the first major wall and the rear wall and the construction of the actuating element in the form of a movable slide disposed in the slot within the housing outline, the actuating element will not give rise to uncertainty when only the rear wall is visible. As a result of the construction of actuating element the major surface of the rear wall only contains the window. A further advantage of this arrangement of the actuating element is that it does not impede insertion of the cassette into a sleeve which only exposes the rear wall. Despite the compact construction the movable slide with a non-smooth surface is convenient to operate. As a result of the compact construction of the anti-erase member and the convenient actuation of the slide, the magnetic-tape cassette in accordance with the invention is in particular suitable for use in a magnetic-tape cassette apparatus where only a limited space is available for the cassette. An example of such a magnetic-tape cassette apparatus is a video camera with built-in magnetic-tape cassette apparatus.

A preferred embodiment of a magnetic-tape cassette in accordance with the invention is characterized in that the anti-erase member comprises a flat substantially rectangular plate, which constitutes the indicator element, which is arranged near the window so as to be slidable along the inner side of the rear wall and which has a substantially rectangular aperture in a central portion, which aperture coincides with the window and leaves the window completely open in the first position. This enables the anti-erase member to be integrally injection-molded from a material in one color. During the sliding movement to the second position the aperture moves away from the window and a portion of the plate adjacent the aperture is disposed behind the window. The construction with the rectangular aperture permits a comparatively robust construction of the plate, so that despite its compactness the anti-erase member can withstand rough usage.

In this respect a further embodiment of a magnetic tape cassette in accordance with the invention is characterized in that the slide is formed on the plate on a first, narrow side of the rectangle, and is guided by the slot in the first major wall. When it is on the opposite second narrow side of the rectangle, the plate is guided by a ledge on the second major wall. Thus, the anti-erase member in the cassette in accordance with the invention is readily movable owing to the presence of the guides and the member is effectively protected against for example impact forces when the cassette is dropped.

Also in connection with this a further embodiment of a magnetic-tape cassette in accordance with the invention is characterized in that the plate comprises plate portions which adjoin opposite sides of the rectangular aperture, of which, viewed in the direction of movement of the plate, a first portion, intended for covering the winwon in the second position, has a greater dimension than a second portion. This yields a construction adapted to the functions of the anti-erase member. The first plate portion serves for covering the window in the second position of the member, and the second plate portion ensures that the plate has an adequate rigidity despite the presence of the aperture.

In this respect a preferred embodiment of the magnetic-tape cassette in accordance with the invention is characterized in that near the first narrow side of the rectangular aperture the plate also carries a lug which constitutes the control element, which adjoins the inner side of the first major wall and which is connected to the first plate portion by a support. As a result of the construction of the first comparatively wide plate portion the lug, on which a sensing element exerts a force when the cassette has been inserted into the apparatus, is nevertheless firmly connected to the plate.

In another preferred embodiment of the magnetic-tape cassette in accordance with the invention the second plate portion carries a projection substantially halfway the two major walls, which projection can be positioned in grooves on the inner side of the rear wall for latching the anti-erase member in the various positions, which grooves extend from the edge adjoining the first major wall substantially perpendicularly to the direction of movement of the plate. As a result of the smaller width of the plate portion the projection is resiliently movable to some extent, while the latching grooves can be formed in the rear wall by means of a comparatively simple mold.

Still another embodiment of the magnetic-tape cassette in accordance with the invention is characterized in that in the rear wall an aperture is formed for positioning a pin which during operation in the second position of the anti-erase member is situated against a side of the rectangular aperture and thereby prevents the plate from being moved out of the second position, while in the first position the broad rectangle-side plate is disposed beside the aperture. In this way the aperture in combination with said rectangle side may serve as a stop for a pin. This precludes inadvertent erasure. As a result of the shifted position of the plate no plate portion is visible through the aperture in the first position, so that the aperture will not confuse identification.

An embodiment of the invention will now be described in more detail, by way of example, with reference to the drawing.

DESCRIPTION OF THE PREFERRED EMBODIMENT

Figure 1:
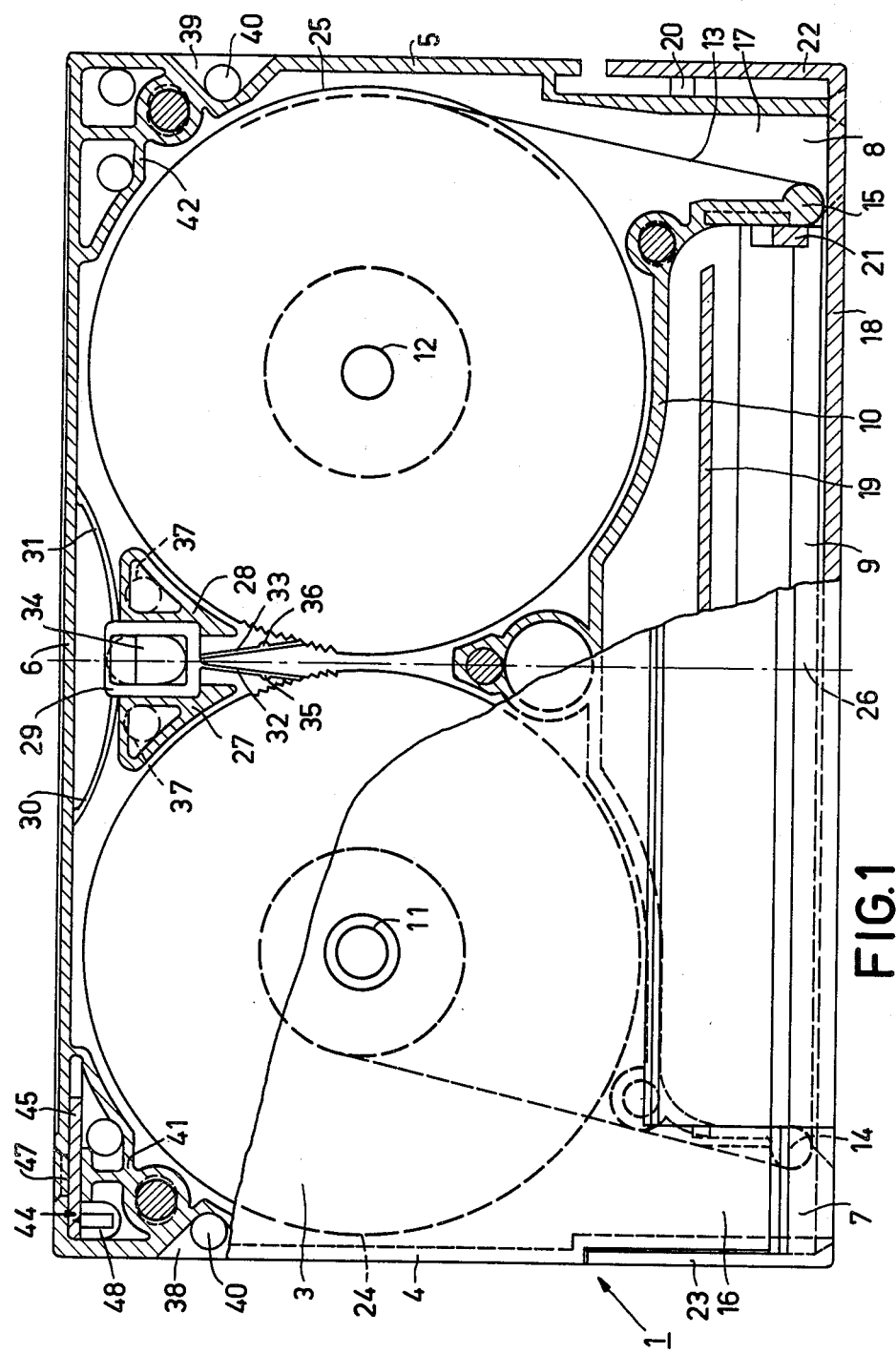
FIG. 1 is a sectional view of a magnetic-tape cassette in accordance with the invention.
Figure 2:
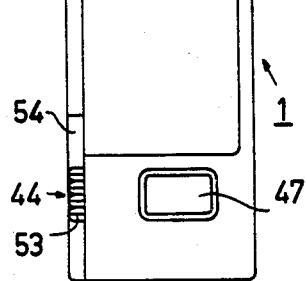
FIG. 2 is a view of the rear wall of the cassette shown in FIG. 1.

The magnetic-tape cassette 1 shown in FIGS. 1 and 2 comprises a housing of which a first substantially rectangular major wall 2 constitutes the cover and a second major wall 3, which is substantially parallel to said first major wall, constitutes the bottom of the box. Further, the housing comprises two short side walls 4 and 5, respectively, a rear wall 6 and a front side with front apertures 7 and 8 near the corners with the respective side walls 4 and 5. At the front the housing has a front aperture 9 which in the embodiment shown continues into the two major walls 2 and 3. A partition 10 separates the front aperture from the interior of the housing to protect the interior against penetration of dust and contaminants and to provide a satisfactory flexural strength of the housing.

Inside the housing two adjacent reel hubs 11 and 12 are arranged between the major walls 2 and 3, which reel hubs are rotatable about axes of rotation which extend perpendicularly to the major walls. These reel hubs can be driven through the first major wall 2 by drive means, not shown, of a magnetic-tape cassette apparatus. The ends of a magnetic tape 13 are attached to the reel hubs, which tape, as is shown in FIG. 1, is partly wound onto the hubs 11 and 12 in the form of tape rolls. On the end portions of the partition 10 situated near the front side tape guides 14 and 15 are arranged. As is shown in FIG. 1, when the cassette is not in operating position, a span of magnetic tape extends between the tape guides 14 and 15 along the front side of the cassette. Passages 16 and 17, which are disposed directly behind the front apertures 7 and 8, respectively, do not contain any tape-guide means except for the tape guides which are only operative when the cassette is not in its operating position. The tape guides 14 and 15 only have passive functions, namely to enable the magnetic tape to be stretched as a span of tape along the front side of the cassette at the location of the front aperture 9. In the non-operating position the magnetic tape is covered by two cassette flaps which are pivotally connected to the cassette housing, an outer flap 18 covering the tape at the outside of the cassette and an inner flap 19 protecting the tape in the aperture 9 at the side of the magnetic tape which faces the interior of the housing. The flap 18 is connected to the side walls 4 and 5 so as to be pivotable about journals 20, while the inner flap 19 is guided in slots in the partition 10 by means of pins 21. The flaps 18 and 19 are so coupled to each other, in a manner not shown, that when the flap 18 is swung open the inner flap 19 is also swung open. The side walls 4 and 5 recede slightly inwards at the location where the journals 20 are mounted, so that side walls 22 and 23 of the outer flap 18 are disposed in line with the major portions of the side walls 4 and 5 viewed in the sectional view shown in FIG. 1.

Near the two reel hubs the magnetic tape 13 is situated between a pair of flanges, the flanges 24 and 25 having serrated edges such that the serrated edge of the flange 24 is mirror inverted in comparison with the serrated edge of the flange 25 relative to a line of symmetry 26. On the bottom or second major wall 3 two upright supports 27 and 28 are arranged, which are partly coaxial with the reel hubs 11 and 12 respectively and which guide a support 29 which by means of leaf springs 30 and 31 bears against the inner side of the rear wall 6 in such a way that the support 29 is resiliently urged away from the wall 6. The support 29 carries two resilient limbs 32 and 33, whose free ends in the position shown in FIG. 1 engage with the stop portion of a serration on the flanges 24 and 25 respectively, so that the flanges cannot rotate about the axis of the reel hub. Inside the support 29 a ramp surface 34 is formed which is adapted to co-operate with a pin, not shown, of a magnetic-tape cassette apparatus, which pin upon insertion of the cassette into a magnetic-tape cassette apparatus moves the support 29 towards the rear wall 6 against the force of the springs 30 and 31. During this movement lugs 35 and 36 on the limbs 32 and 33 contact wall portions of the supports 27 and 28, so that the limbs 32 and 33, which tend to move away from each other when free, are urged towards each other during the movement towards the rear wall 6. As a result of the movement of the support 29 towards the rear wall 66 the flanges 24 and 25, and consequently the respective reel hubs 11 and 12, can rotate so that the drive means, not shown, of the apparatus can drive the magnetic tape 13 and wind it onto one of the reels. The opposite occurs when the cassette is removed from the apparatus. In that case the support 29 moves away from the side wall 6 and the limbs 32 and 33 are pivoted away from each other after the lugs 35 and 36 have left the supports 27 and 28. Immediately after this the free ends of the limbs 32 and 33 reach a serration of the flanges 24 and 25 and as they move further away from the rear wall 6 the limbs 32 and 33 cause the flanges 24 and 25 to rotate in mutually opposite directions, a length of tape being taken up as a result of which the tape is stretched between the tape guides 14 and 15 along the front side of the cassette. An advantage of the construction of the supports 27 and 28 is that they can form a substantially right-angle triangle, so that space is available in the area between the walls of the triangle. Thus, a pair of apertures 37 may be formed in the first major wall 2 for co-operation with a sensor of the magnetic-tape cassette apparatus, which sensor can penetrate through the apertures 37 into the space within the substantially triangular supports 27 and 28.

In the side wall 4 and 5 cavities 38 and 39 are formed which are adapted to co-operate with a gripping mechanism, not shown, of a magnetic-tape cassette apparatus which is capable of transferring the cassette into or out of the operating position in the apparatus. Such a gripping mechanism may for example form part of a cassette-changer device in the apparatus, intended for consecutively playing back, or making a recordings on, the cassettes. The major walls 2 and 3 also extend at the location of the cavities 38 and 39, so that apertures 40 may be formed in the major walls, which apertures, in the same way as the apertures 37, can co-operate with sensing elements of the magnetic-tape cassette apparatus. This has the advantage that the cavities 38 and 39 both enable the cassette to be gripped and to be sensed.

Directly adjacent the cavities 38 and 39 two apertures are formed in the two rear corners of the cassette. In the same way as for the apertures 37 and 40, the cassette housing is closed towards the inside at the location of these apertures to prevent the penetration of dust and contaminants into the interior of the cassette. For this purpose a wall 41 extends from the cavity 38 towards the rear wall 6 and partly surrounds the flange 24 coaxially, and symmetrically relative to the line 26 a wall 42 also extends from the cavity 39 towards the rear wall 6. The wall 41 together with the corner portion of the rear wall 6 and the corner portion of the side wall 4 bounds a corner portion of the cassette which is shown in more detail in FIGS. 3, 4 and 5.

Figure 3:
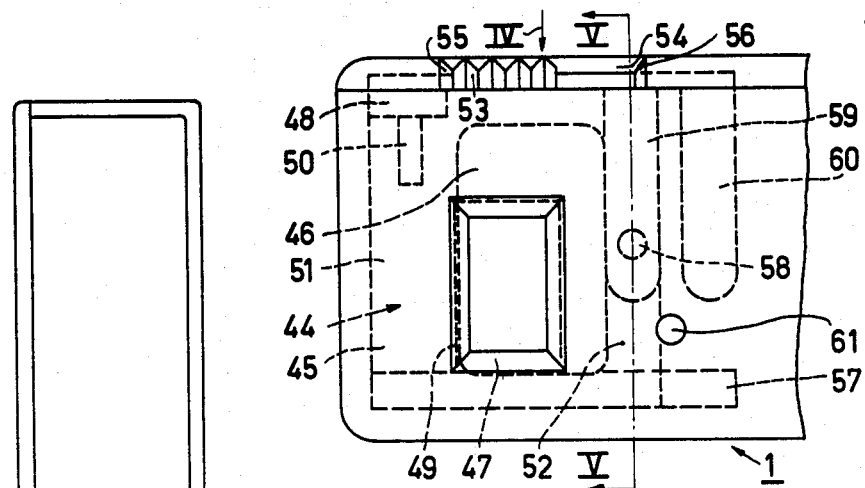
FIG. 3 is a view, on an enlarged scale, of a part of the rear wall.
Figure 4:
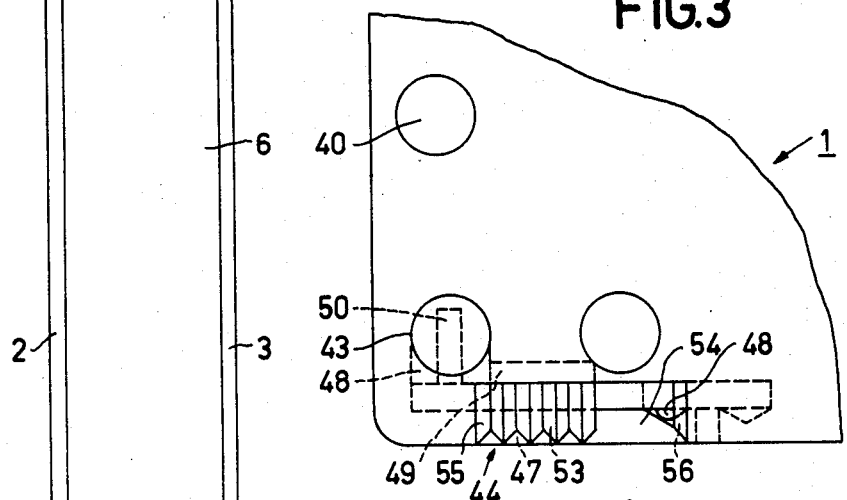
FIG. 4 is a view of a part of the upper wall of the cassette indicated by the arrow IV in FIG. 3.
Figure 5:
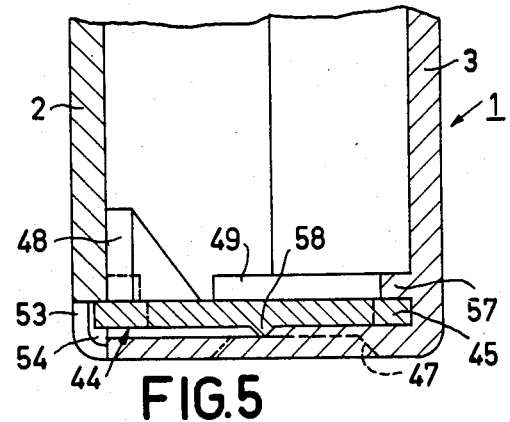
FIG. 5 is a sectional view of a part of the cassette taken on the lines V-V in FIG. 3.

As is shown in plan view in FIG. 4 this corner portion has a sensing aperture 43 in the first major wall 2 in the immediate vicinity of the location where the side wall 4 and the rear wall 6 adjoin each other. This aperture also serves for receiving a sensing element of a magnetic-tape cassette apparatus, which element can be moved into the aperture and, if the aperture 43 is free, actuates an anti-erase device in the magnetic-tape cassette apparatus. If the aperture 43 is free this inhibits the recording mode of the magnetic-tape cassette apparatus. In order to achieve this, an anti-erase member 44 is arranged in the corner portion of the cassette, which member is situated mainly inside the cassette housing and is movable substantially rectilinearly between a first and a second position. The anti-erase member 44 is suitably injection-molded integrally from a material in a color which contrasts strongly with the color of the housing. The anti-erase member 44 comprises a flat substantially rectangular plate 45 which is shown in cross-section in FIG. 5 and which is indicated schematically by dotted lines in FIG. 3. The plate 45 forms an indicator element for the position the anti-erase member 44 and in a central portion it has a substantially rectangular aperture 46, whose sides extend substantially parallel to the edges of the plate 45. In the first position of the anti-erase member 44 shown in FIG. 3 the plate 45, via the aperture 46, completely exposes a window 47 in the rear wall 6 of the housing. Suitably, the window 47 (see also FIG. 2) has inwardly bevelled edges. In this position of the anti-erase member a control element comprising a lug 48 closes the aperture 43, so that if the cassette is sensed by a sensing element of the apparatus the apparatus is allowed to make a recording in the first position of the anti-erase member. As a result of the presence of a wall 49 which extends from the second major wall 3 behind the window 47 the window has the same color as the housing, suitably a dark color, in this position of the anti-erase member. The position of the anti-erase member is distinctly visible. The lug 48 is reinforced by means of the support 50, which extends perpendicularly to the plate 45 and which is connected to a first plate portion 51 of the plate 45. The plate portion 51 adjoins a side of the rectangular aperture 46, while at the opposite side of the rectangular aperture a second plate portion 52 is disposed, the plate portion 51, which serves to cover the window 47 in the second position of the anti-erase member, having a greater dimension, viewed in the direction of movement of the plate, than the second plate portion 52. In this way the first plate portion 51 forms the actual indicator element of the plate 45.

On a first narrow rectangle side of the plate 45 there is arranged an actuating element formed by a serrated slide 53 which is situated in a slot 54 at the outside of the cassette housing in the edge between the first major wall 2 and the rear wall 6. It is to be noted the slot 54 may be formed in the major wall 2 in the immediate vicinity of the connecting edge at a small distance from the rear wall 6. The slot 54 is bounded by outwardly bevelled stop edges 55 and 56. These edges limit the movement of the slide 53, the slide abutting with the stop edge 55 in the first position of the anti-erase member and with the stop edge 56 in the second position. The slide 53 has an outer surface which is disposed within tangent planes to the first major wall 2 and the rear wall 6, so that the slide 53 does not project from the housing and despite its arrangement in the slot 54 is convenient to operate (see FIGS. 3 and 5). The slot 54 constitutes a guide at a first narrow side of the rectangular plate 2; at the opposite second narrow side of the rectangular plate 2 a guide is arranged on the second major wall 3, which guide is formed by a ledge 57 which locally extends behind the window 57 towards the major wall 2 in the form of the wall 49. Thus, the plate 45 is arranged against the rear wall 6 so as to be slidable within guides in and on the respective major walls. Substantially halfway between the two major walls the second plate portion 52 comprises a projection 58 which latches the anti-erase member 44 in the two positions. For this purpose grooves 59 and 60 are formed in the inner side of the rear wall 6, in which the projection 58 can engage. The slots suitably extend from the edge of the rear wall adjoining the first major wall 2 substantially perpendicularly to the direction of movement of the plate 45 up to some distance from the plate 3 (see FIG. 3). The advantage of this shape is that the slots can simply be formed in the rear wall by injection-molded. Moreover, this simplifies mounting of the anti-erase member in the cassette housing.

In the rear wall 6 a further aperture 61 is formed which serves to receive a pin, not shown, which in the second position of the anti-erase member 44 is positioned against a side of the rectangular aperture 46 and thereby prevents the plate 45 from moving from the second position to the first position. This ensures that a magnetic-tape cassette containing a recording cannot be erased inadvertently because the anti-erase member cannot be moved to the first position in which recording is possible without removing the pin. Providing an anti-erase member as shown in the Figures and described in the foregoing has the great advantage that it requires comparatively little space inside the cassette housing. The relevant construction is particularly suitable for comparatively small magnetic-tape cassettes as used in mobile magnetic-tape cassette equipment, for example a video camera with built-in cassette apparatus. As already stated, the construction has the advantage that an anti-erase member can be manufactured integrally and that all parts have the same color, without this giving rise to mistakes when only the rear wall of the cassette is visible. As can be seen in FIGS. 2 and 3 the only aperture in the surface of the rear wall 6 is formed by the window 47, the aperture 46 ensuring that the window is dark in the first position and that the window has a contrasting color as a result of the presence of the first plate portion 51 in the second position. In this position the aperture 61 is also dark because the second plate portion 52 is then disposed beside the aperture 61 (FIG. 3). Only beside the major surface of the rear wall 6 a colored portion of the anti-erase member 44 is present in the form of the control element 53, but this element is arranged so that this cannot give rise to mistakes when ascertaining whether the anti-erase member is in the first or in the second position. Suitably, the magnetic-tape cassette in accordance with the invention is inserted into a sleeve which only exposes rear wall 6. It is then important that the cassette in accordance with the invention does not comprise any projections which impede insertion into the sleeve. If the cassette is contained in the sleeve and is, for example, placed on a book shelf between other cassettes, the user can see directly whether the relevant cassette is suitable for recording or not. The cassette in accordance with the invention precludes any form of uncertainty. In practice this is of great importance because the user generally has to decide within a short time which cassette may be used for recording or not.

It is to be noted that instead of the aperture 43 the window 47 may be scanned by a sensing element; in the second position the anti-erase member 44 closes the window 47 with the plate portion 51, which can be detected by the sensing element.

It is to be noted also that the cassette in accordance with the invention, if used by a manufacturer who provides the tape with recordings, can simply be adapted to this purpose by dispensing with the anti-erase member 44 and forming the aperture 43 with an integral break-out tab. This results in a universal cassette, which by removing the relevant break-out tab from the aperture 43 and fitting the anti-erase member 44 is suitable for universal use, or by dispensing with the anti-erase member 44 is suitable only for use in conjunction with prerecorded magnetic tapes. In the last-mentioned case the manufacturers even use a label, to be applied to the rear wall 6, which extends across the window 47 or use the same contrasting color on the label at the location of the window 47.

What is claimed is:

1. A magnetic-tape cassette, which comprises:
    a housing having two mutually parallel substantially rectangular major walls, two side walls, a rear wall and a front side formed with front apertures,
    two reel hubs which are arranged adjacent each other between the major walls and which are rotatable about axes of rotation which extend perpendicularly to the major walls,
    a magnetic tape which is connected to the reel hubs, which tape, at least over a part of its length, is wound onto the reel hubs and which further extends along front apertures in the front side of the housing to co-operate with parts of a magnetic-tape cassette apparatus in which the cassette is placed,
    a sensing aperture in one of the walls near a corner of the housing, a sensing element of the magnetic-tape cassette apparatus being movable into the sensing aperture,
    an anti-erase member which is disposed at least partly inside the housing and is slidable substantially rectilinearly between a first and a second position, and which can be latched in these positions,
    a control element which is integral with the anti-erase member, which element closes the sensing aperture in the first position and leaves said aperture free in the second position, an actuating element which is disposed outside the housing integral with the anti-erase member, and which enables the anti-erase member to be shifted manually, a window in one of the walls of the housing, through which window the position of the anti-erase member is visible, and an indicator element which is integral with the anti-erase member, which leaves the window free in the first position and which covers the window in the second position, characterized in that:

the window is situated in the rear wall of the housing, the sensing aperture is situated in a first major wall of the housing, a slot is formed at the outside of the housing substantially at the edge between the first major wall and the rear wall, and the actuating element comprises a movable slide which as a non-smooth outer surface and is disposed in the slot, the outer surface being disposed within tangent planes to the first major wall and the rear wall.

2. A cassette as claimed in claim 1, characterized in that the anti-erase member comprises a flat substantially rectangular plate which constitutes the indicator element and is arranged near the window so as to be slidable along the inner side of the rear wall, said plate having a substantially rectangular aperture in a central portion thereof, which aperture coincides with the window and leaves the window completely open when the member is in the first position.

3. A cassette as claimed in claim 2, characterized by comprising a ledge on the second major wall, and further characterized in that the slide is formed on the plate on a first, narrow side of the rectangle, and is guided by the slot in the first major wall; and on the opposite second narrow side of the rectangle said slide is guided by said ledge.

4. A cassette as claimed in claim 2 or 3, characterized in that said plate comprises first and second plate portions which adjoin opposite sides of the rectangular aperture, and in that the first portion, viewed in the direction of movement of the plate, is arranged to cover the window in the second position and has a greater dimension than the second plate portion.

5. A cassette as claimed in claim 4, characterized in that the rectangular aperture has first and second narrow sides respectfully adjacent the first and second major walls, and in that the plate comprises a lug which adjoins the inner side of the first major wall and constitutes the control element, and a support which connects the lug to the first plate portion.

6. A cassette as claimed in claim 4, characterized in that the second plate portion includes a projection disposed substantially halfway between the two major walls, and the cassette rear wall has grooves on the inner side thereof extending from the wall edge adjoining the first major wall substantially perpendicularly to the direction of movement of the plated, for latching the anti-erase member in the various positions by engagement of said projection in a respective one of said grooves.

7. A cassette as claimed in claim 6, characterized in that the cassette rear wall is an aperture adapted for receiving a pin arranged such that, for operation in the second position of the anti-erase member, the pin is disposed against a side of the rectangular aperture to prevent the plate from being moved out of the second position, and for operation in the first position the first plate portion is disposed beside the pin aperture.

8. A cassette as claimed in claim 5, characterized in that the cassette rear wall is an aperture adapted for receiving a pin arranged such that, for operation in the second position of the anti-erase member, the pin is disposed against a side of the rectangular aperture to prevent the plate from being moved out of the second position, and for operation in the first position the first plate portion is disposed beside the pin aperture.

9. A cassette as claimed in claim 4, characterized in that the cassette rear wall is an aperture adapted for receiving a pin arranged such that, for operation in the second position of the anti-erase member, the pin is disposed against a side of the rectangular aperture to prevent the plate from being moved out of the second position, and for operation in the first position the first plate portion is disposed beside the pin aperture.

* * * * *

UNITED STATES PATENT AND TRADEMARK OFFICE
CERTIFICATE OF CORRECTION

PATENT NO. : 4,473,202
DATED : September 25, 1984
INVENTOR(S) : ROBERTUS J.M. VERHOEVEN It is certified that error appears in the above-identified patent and that said Letters Patent is hereby corrected as shown below:

Claim 1, line 45, after "which" change "as" to --has--.
(Col. 9, line 19)

Signed and Sealed this

Fifth Day of March 1985

[SEAL]

Attest:

DONALD J. QUIGG

Attesting Officer

Acting Commissioner of Patents and Trademarks